(12) United States Patent
Knop et al.

(10) Patent No.: US 8,709,128 B2
(45) Date of Patent: Apr. 29, 2014

(54) PROCESS FOR PRODUCTION OF DIRECT REDUCED IRON

(75) Inventors: Klaus Knop, Sulzburg (DE); Sten Ångström, Luleå (SE)

(73) Assignee: Luossavaara-Kiirunavaara AB, Luleå (SE)

( * ) Notice: Subject to any disclaimer, the term of this patent is extended or adjusted under 35 U.S.C. 154(b) by 281 days.

(21) Appl. No.: 13/122,729

(22) PCT Filed: Sep. 22, 2009

(86) PCT No.: PCT/SE2009/051049
§ 371 (c)(1),
(2), (4) Date: Jun. 29, 2011

(87) PCT Pub. No.: WO2010/042023
PCT Pub. Date: Apr. 15, 2010

(65) Prior Publication Data
US 2011/0247457 A1    Oct. 13, 2011

(30) Foreign Application Priority Data
Oct. 6, 2008  (SE) ...................................... 0802100

(51) Int. Cl.
*C21B 3/02*    (2006.01)
(52) U.S. Cl.
USPC ......................................................... 75/392
(58) Field of Classification Search
USPC ......................................................... 75/392
See application file for complete search history.

(56) References Cited

U.S. PATENT DOCUMENTS

| 4,756,750 A | 7/1988 | Bixler et al. |
| 6,562,103 B2 | 5/2003 | Sethna et al. |

FOREIGN PATENT DOCUMENTS

| WO | 00/49184 A1 | 8/2000 |
| WO | 2007/088166 A1 | 8/2007 |

OTHER PUBLICATIONS

International Search Report received for PCT Patent Application No. PCT/SE2009/051049, mailed on Jan. 14, 2010, 5 pages.

*Primary Examiner* — Rebecca Lee
(74) *Attorney, Agent, or Firm* — Morrison & Foerster LLP

(57) ABSTRACT

The present invention relates to a process for the direct reduction of iron ore performed by means of a plant comprising a gravitational furnace (2) having at least one iron ore reduction zone (8) in the upper part thereof, and at least one carbon deposition zone (9) and one reduced metal product cooling zone (10) in the lower part thereof, and means for feeding a reducing gas mixture into the reactor in correspondence to the with the reduction zone, means for recycle exhaust or reactor off gas from the reactor to syngas and mixing the recycled gas with natural gas to form a reducing gas mixture. According to the invention a in first reformation step (5) unreacted carbon monoxide CO and steam present in the reactor off gas is reformed to carbon dioxide and hydrogen following the water gas shift reaction $CO+H_2O=CO_2+H_2$, in a secondary reformation step the de-watered reactor off gas comprising mainly of carbon dioxide and hydrogen is processed to remove carbon dioxide, and in a third reformation step physical separation of both nitrogen and carbon oxide CO from the reducing syngas is carried out to bring down the levels of CO and any existing other gases in the recycled gas to as low level as possible such that recycled reducing gas is as close to pure hydrogen $H_2$ as possible.

17 Claims, 2 Drawing Sheets

PROCESS FOR PRODUCTION OF DIRECT REDUCED IRON

CROSS REFERENCE TO RELATED APPLICATIONS

This application is a U.S. National Phase patent application of PCT/SE2009/051049, filed Sep. 22, 2009, which claims priority to Swedish patent application Serial No. 0802100-8, filed Oct. 6, 2008, all of which are hereby incorporated by reference in the present disclosure in their entirety.

FIELD OF THE INVENTION

The present invention relates generally to a process for production of direct reduced iron according to the preamble of claim 1. More specifically, the present invention relates to a process for cleaning and removal of carbon dioxide and steam from spent reducing gas in a process for the direct reduction of iron.

BACKGROUND OF THE INVENTION

Direct reduction processes for producing metallized iron from iron oxide pellets, lump ores, or similar materials which include iron oxide, are widely known and used in the steel industry. Direct reduction (DR) processes produce metals from their ores by removing associated oxygen from the ores at temperatures below the melting temperature of any of the materials involved in the process. The product obtained as a result of a direct reduction process is known as DRI or "Direct Reduced Iron". The direct reduction process converts iron ore into a highly metallized iron product. The actual reduction of the iron ore in the direct reduction reactor is carried out in the presence of a reducing gas for example natural gas that comprises the reducing agents hydrogen ($H_2$), and carbon monoxide (CO) which during contact reduces iron ore to metallic iron. Alternatively, reducing gas in the form of carbon monoxide can be produced by a gasifier by the combustion process that occurs when carbon reacts with oxygen which reaction also has the advantage of providing heat for the subsequent gasification reactions in the shaft furnace.

When the direct reduction reactions are carried out in furnaces below about 1000° C., the reducing agents usually are restricted to CO and $H_2$. In the DRI process, the iron is reduced and the carbon dioxide, produced in the reduction reaction, is removed with the spent reducing gas commonly known as the reactor off-gas. The reactor off-gas includes unreacted hydrogen $H_2$, unreacted carbon monoxide CO, carbon dioxide $CO_2$ and water $H_2O$ in the form of steam. After cooling, the reactor off-gas is reprocessed to remove the carbon dioxide and enrich the hydrogen and carbon monoxide content before returning the enriched off-gas to the direct reduction reactor as an effective reducing gas. The refined product known as syngas (from synthesis gas) is a gas mixture containing varying amounts of carbon monoxide and hydrogen by gasification of the reactor off gas to a gaseous product with a heating value. Syngas is per definition a product containing primary of carbon monoxide, carbon dioxide and hydrogen. The reactor off gas contains significant levels of carbon dioxide and water which form during the reaction. Some schemes use a reforming step to provide more hydrogen and carbon monoxide and some schemes use a water gas shift step reaction to enhance the recycle gas to provide the refined high strength reducing gas known as syngas. All of the schemes must remove carbon dioxide from the reactor off gas to maintain the reduction process.

The direct reduction of iron ore, i.e. iron oxides mainly hematite $Fe_3O_3$, is accomplished by reduction of the iron ore by reaction with carbon monoxide, hydrogen and/or solid carbon through successive oxidation states to metallic iron. Typically, oxides of iron and carbonaceous material, e.g. coal, are charged into a furnace. Heat is supplied to the furnace by the combustion of fuel with air to generate, inter alia, carbon monoxide. As the solid material moves down the reactor it meets a stream of reducing gas flowing in the opposite direction and the material is reduced to metallic iron and recovered from the furnace. Exhaust and furnace gases are removed from the furnace through an exhaust gas line or duct. Direct reduction plants for producing direct reduced iron, known as DRI (sponge iron) or hot briquetted iron (pre-reduced materials useful as feedstock for iron and steel making), currently produce such products by contacting a reducing gas, composed principally of hydrogen and carbon monoxide, at effective reduction temperatures in the range from about 750° C. to about 1050° C., over a bed of particulate iron-containing material in the form of lumps or pellets. The gas streams used in direct reduction are often quantified on the basis of the ratio between the reducing agents and oxidizing agents defined as the mole ratio $(H_2+CO/H_2O+CO_2)$ of a gas mixture. This value is commonly referred to by the term "reducing ratio" or "R" value. The reducing ratio is a measure of the efficiency of a gas mixture when used as a reductant; the higher the reducing ratio the greater the efficiency.

During the years various processing schemes have been developed for generation of a high strength syngas from spent reducing gas or reactor off-gas, containing a high concentration of $H_2$ and CO, for the direct reduction of iron (DRI) process and other processes. In the recent years, the necessity of rendering the steelmaking processes more efficient, more productive, and less wasteful, has become increasingly urgent, due to rising production costs (particularly energy costs) and also due to the increasing restrictions imposed upon steel plants for ecological reasons. The purpose of the present invention is therefore to achieve a process for production of direct reduced iron which in a simpler manner improves the reformation of the reactor off gas to produce syngas effluent high in hydrogen and carbon monoxide. Another purpose is to achieve a significant reduction of fossil fuels specific consumption, i.e. to lower the specific consumption of fossil primary energy and significantly reduce the specific $CO_2$ emissions per ton produced DRI.

It is therefore an object of the invention to provide a process for production of direct produced iron by which the capacity of DRI production can be increased and which process at the same time enable to reduce the consumption of fossil fuels.

It is a further object of the present invention to achieve a recycling gas by cleaning and removal of carbon dioxide and steam from spent reducing gas in a process for the direct reduction wherein the recycled gas is essentially pure hydrogen in order to further improve reduction properties in the reactor.

It is a further object of the present invention to provide a process that reduces problems with metal dusting from the plant, particles and other undesirable components in the reactor off gas without increase use of water.

It is a further object of the present invention to provide a process that reduces use of water in particular as cooling medium during reformation of the reactor off gas to syngas. Cooling and reheating requires costly heat exchange equipment and associated large high temperature piping makes the process less attractive. It is also well known to use water in scrubbers for dust removal.

Other objects of the invention will be pointed out in this specification or will be evident to those skilled in the art.

BRIEF DESCRIPTION OF THE INVENTION

The present invention relates to a process for the production of direct reduced iron DRI in which carbon dioxide $CO_2$ and steam $H_2O$ from spent reducing gas in the process is removed to produce a reformer or syngas effluent high in hydrogen and carbon monoxide. The object of the invention is generally achieved by carrying out the process as defined in claim 1.

In more detail, the method comprises reformation of unreacted carbon monoxide CO present in the reactor off gas to carbon dioxide and hydrogen as a first reformation step following the water gas shift reaction $CO+H_2O=CO_2+H_2$ wherein steam present in the off gas functions as reactive water. The said first reformation step precedes a secondary reformation step in which the reactor off gas is further processed to remove the carbon dioxide and enrich the hydrogen and carbon monoxide content before returning the enriched off-gas to the direct reduction reactor. Among a number of well known transition metal and transition metal oxides magnetite $Fe_3O_4$ is preferably used as catalyst for the water gas shift reaction. As the shift reaction is exothermic, i.e. a reaction that releases heat, the exhaust gas leaves at a temperature about 480-520° C. which is about 120° C. higher than the top gas temperature as such. The sensible heat or potential energy gained is used in succeeding gas refining steps. A third reformation step is to reduce the reactor off gas further by removal of the carbon oxide and nitrogen to achieve a recycled gas essentially consisting of pure hydrogen.

In the secondary reformation step the reactor off gas comprising mainly of carbon dioxide and hydrogen is processed to remove carbon dioxide, thus producing an essentially carbon dioxide free shaft furnace recycle stream. This essentially carbon dioxide free recycle stream is heated and recycled to the shaft furnace as part of the total reducing gas.

It is well known that in order to obtain a high strength reducing gas from a reformer in which the reactor off-gas is refined to syngas containing a high concentration of $H_2$ and CO, it is desirable to maintain low level of steam in the inlet stream to the reformer. The basic reason for reduced steam content of the reducing gas is the diluent effect of the steam in the reforming operation. Though, removal of steam from the reformer would yield a high strength reducing gas, such a step is considered uneconomic because it would be necessary to cool the reformer effluent for water condensation and removal after which it would have to be reheated prior to introduction into the iron ore reduction facility. Cooling and reheating requires costly heat exchange equipment and associated large high temperature piping which would make the process unattractive. In addition, the water condensation step increases pressure drop and, thus, requires that the reformer operation be carried out at much higher pressure necessitating an increase in either the operating temperature or the steam-carbon ratio, or both, in order to meet the residual methane requirement. Current schemes for producing high strength reducing gas need to be improved for energy efficiency and reduced product cost. In order to improve this present invention employs a catalytic processing step arranged after the shaft furnace in which steam in the reactor off gas is shifted to hydrogen by unreacted carbon monoxide by the water shift gas reaction $CO_2+H_2O=CO+H_2$. In the present described embodiment a catalyst such as magnetite or brown iron is used. The water shift gas reaction is sensible to temperature wherein the tendency to shift to reactants increases at higher temperatures. Hence, the relatively high temperatures in the reactor off gas which hereto has been considered as a problem can be used as an advantage. Also, the fact that reactor off-gas from the DRI reactor is of produced at low pressure which normally is considered as a drawback can be used as an advantage.

The invention also comprises a third reformation step of physical separation of both nitrogen and carbon oxide CO from the reducing syngas from above mentioned step one and two. The purpose of the third reformation step is to bring down the levels of CO and any existing other gases in the recycled gas to as low level as possible such that recycled reducing gas is as close to pure hydrogen $H_2$ as possible.

BRIEF DESCRIPTION OF THE DRAWINGS

Features, objects and advantages of the present invention will become apparent from the following description of preferred embodiments with reference to the drawings in which like reference characters designate like or corresponding parts throughout several views, and in which.

DETAILED DESCRIPTION OF THE INVENTION

Two alternative process schemes are described here below, one with and one without a complementary heater for heating primary reformer effluent high in hydrogen $H_2$. These schemes are shown in FIGS. 1 and 2, respectively.

Figure 1:
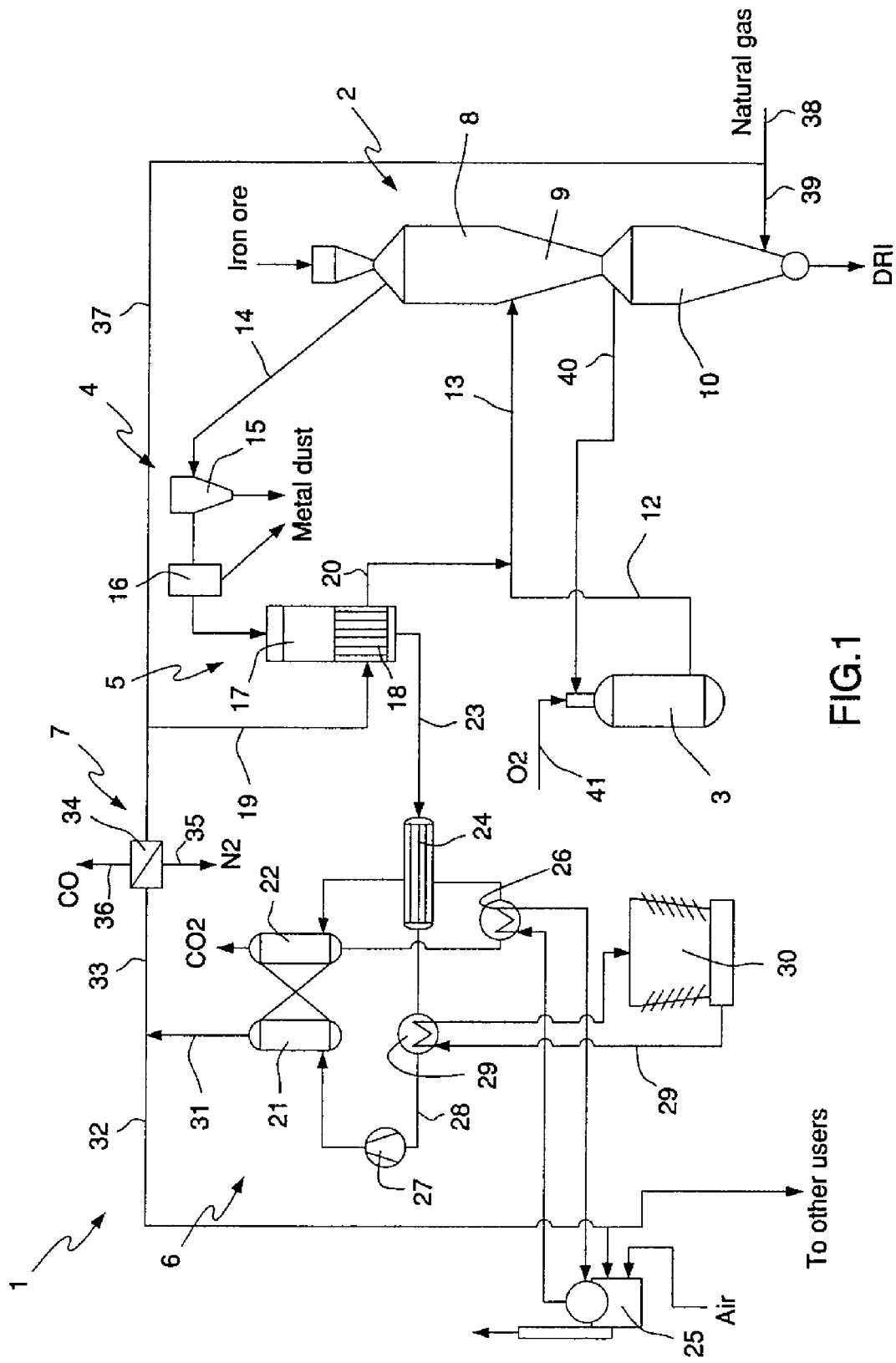
FIG. 1 shows schematically a first embodiment of the present invention, illustrating a diagram of the process and apparatus for producing DRI in accordance to the present invention.
Figure 2:
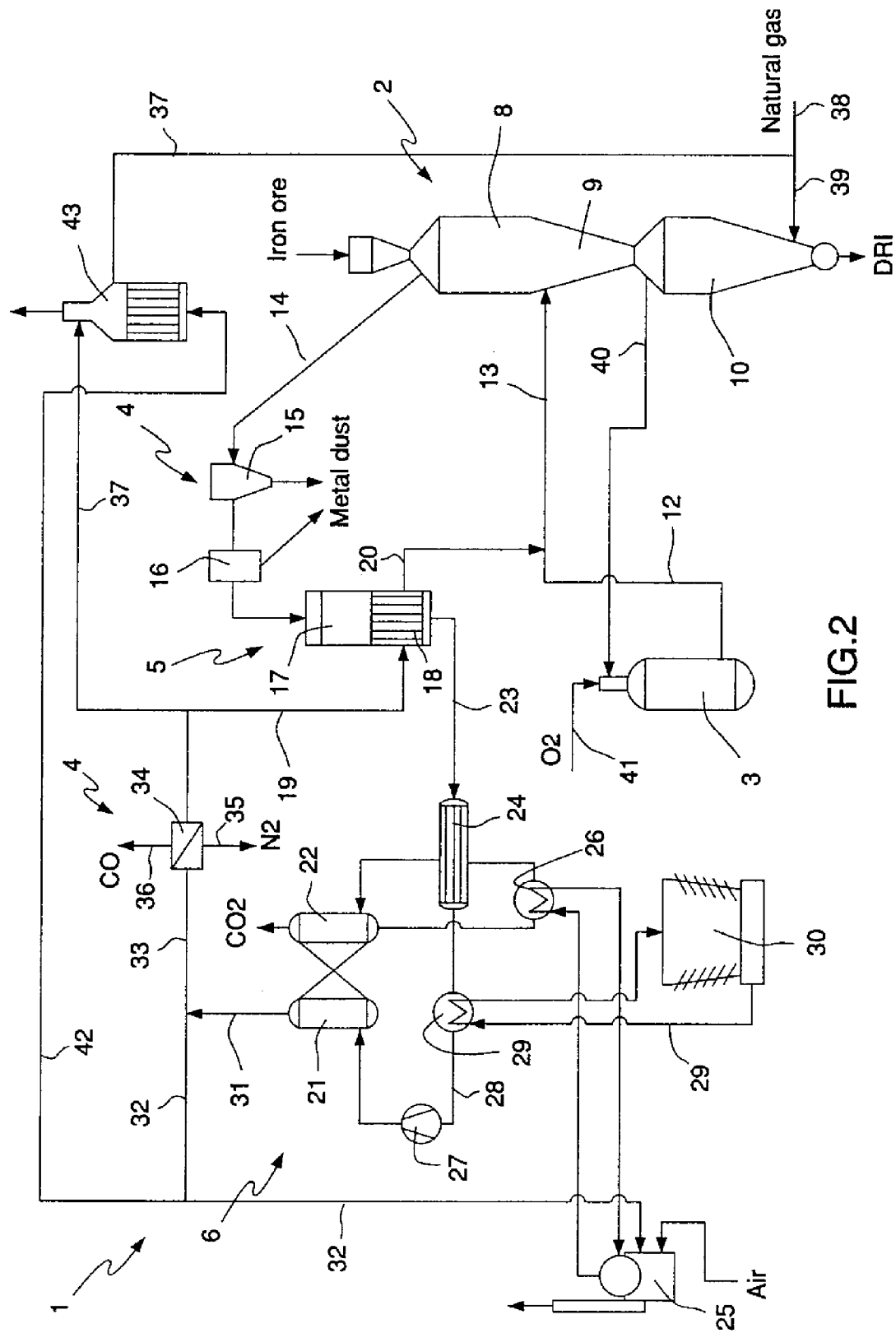
FIG. 2 shows schematically a second embodiment of the present invention.

With reference to FIG. 1 a first layout of a reduction plant designated by the reference numeral 1 suitable for performing the process according to the present invention is illustrated. In the layout numeral 2 generally represents a direct reduction shaft for production of DRI, 3 represents a gas generator supplying synthesis gas, otherwise known as syngas which is used gas recovered from the reactor and refined to be used as the reducing gas in the reduction shaft, 4 represents a particle cleaning system for separating metal dusting from reactor off gas drawn from the reactor, 5, 6 and 7 represent a reformation system comprising three reformation steps wherein 5 represents a first reformation step for steam reforming carbon monoxide present in the reactor off gas to carbon dioxide and hydrogen and 6 a second reformation step for removal of carbon dioxide from the steam reformed reactor off gas and 7 represents a third reformation step for removal of nitrogen and carbon oxide from the reactor off gas.

The direct reduction shaft 2 comprises from top to bottom an iron ore feeding zone, a reactor zone 8 for the direct reduction of the minerals, a carburization zone 9 and a cooling vessel 10. The reactor or shaft 8 produces hot metallic iron or DRI, from oxides in the form of pellets and/or lumps that descends due to the effects of gravity into the carburization zone 9. The cooling vessel 10 downstream is in turn directly connected to a discharging device. There is thus a single flow of material from the top to the bottom or base of the shaft or column. As the solid material flows down through the reactor 8 it meets a stream of reducing gas flowing in the opposite direction that is fed into the reaction zone of said reactor, said zone being substantially cylindrical in shape into which zone a stream of the reducing gas is fed from the gas generator 3 by ducts 12, 13.

Exhaust or "off gas" gas is extracted from the upper part of the reactor 8 after having reacted with the iron oxides and flows along an exhaust gas line or duct 14 to the particle cleaning system 4. The temperature of the exhaust gas depends on the iron ore being charged to the reactor but generally leaves the reactor at about 340 to 380° C. As there is dust in the exhaust gas extracted from the reactor 8 the off gas sent to the particle cleaning system passes thought a multi-cyclone 15 in which the main part of dust in the off gas is separated and thereafter a filter 16 where a large amount of the rest-dust and fine particles are separated from the off gas. Most of the metal dusting and particles in the reactor off gas can be removed herewith. After a suitable processing comprising compacting of metal dust from the particle cleaning system 4 to briquettes or lumps of suitable size and form the material can be charged on the shaft furnace.

The first reformation step 5 comprises a shifter 17 for steam reforming of hydrocarbons and in which the thus particularly cleaned reactor off gas can be de-watered by reformation to carbon dioxide and hydrogen. In more detail, the shifter 17 is designed to convert unreacted carbon monoxide CO present in the reactor off gas to carbon dioxide following the well known water gas shift reaction $CO+H_2O=CO_2+H_2$ wherein steam present in the off gas functions as reactive water. The shifter 17 can comprise any catalyst known in the art to be suitable for the water gas shift reaction such as magnetite or any transition metals or transition metal oxides. In the present embodiment brown iron in the form of stones are used as catalyst. The water gas shift reaction is very sensitive to temperature with tendency to shift towards reactants with increasing temperature wherein the high temperature of the off gas is used as an advantage. As the reaction in the first reformation step 5 is exothermic, the de-watered off gas leaves at a temperature higher than it had when it first entered the system step. Hence, the temperature of the de-watered gas leaving the shifter 17 along a duct or line designated 16 normally is about 480-520° C. In a heat exchanger 18, installed after the shifter 17 the de-watered off gas, mainly comprised of carbon dioxide and hydrogen, is cooled down to about 300-340° C. by heat exchange with a part of recycled gas passing along line 19. In more detail, heat from the shifter 17 of the first reformation step 5 is utilized to heat recycled gas containing a high concentration of CO and $H_2$ coming from the second reformation step 6 before the recycled gas in line 20 is mixed with a stream of syngas supplied by an external source, in this case the gas generator 3, and having a temperature of about 1200° C. The preparation of recycled gas as well as the syngas from the gas generator 3 will be discussed more in detail here below.

The second reformation system step 6 for removal of carbon dioxide $CO_2$ from the de-watered off gas comprises a $CO_2$ absorber 21 and a $CO_2$ stripper 22 which as such are well known in the art. From the heat exchanger 18 the de-watered gas is passed along line 23 to a reboiler 24 to which sensible heat of the gas is emitted. Steam produced on the one hand by the reboiler 24 by the influence of the sensible heat received from de-watered gas passed through the reboiler, and sensible heat received from steam generator 25 via the heat exchanger 26 on the other hand is utilized in the $CO_2$ stripper to desorb carbon dioxide from the de-watered gas in a manner as such well known in the art. High purity carbon dioxide $CO_2$ removed from the stripper can preferably be collected and sold to other users. Before reaching a compressor or pumping means 27, also forming part of the second reformation system 6, the de-watered gas flowing along line 28 is cooled down by passing a water quench 29. The heated water from the water quench is directed via line 29 to a cooling tower 30 for cooling. The de-watered gas sent in line 28 to the compressor or pumping means 27 passes through $CO_2$ absorber 21 thereby increasing its reducing potential. After have been treated in the $CO_2$ absorber 21 the gas in line 31 has a composition mainly comprised of carbon oxide, carbon dioxide and hydrogen.

The stream of recycled gas 14 in line 31 is split into two flow paths 32 and 33 of which path 32 on the one hand is used as combustible tail gas in the steam generator 25 and on the other hand also can be collected and distributed to other users. As the amount of tail gas should be low in order to be able to be used as a reduction medium $N_2$ comprised in the gas has to be removed. Hence, the gas the flow in the second flow path 33 is brought to pass through a nitrogen $N_2$ separator comprised of a physical separation means such as a molecular sieve 34 or in short mole sieve designed to adsorb the nitrogen in the gas. The physical separation means could be comprised of any separations means for the purpose such as membranes, molecule sieves or chemical absorption system. The molecular sieve 34 is preferably designed to adsorb not only the nitrogen but also carbon oxide CO present in the gas which is removed burned and mixed with the $CO_2$ from the $CO_2$ stripper 22. The molecular sieve 34 can comprise any suitable material having an open structure with molecular absorbable features as a non limiting example such as any aluminium silicate, clay active carbon or synthetic carbon etc. Stream 35 indicates the release of the $N_2$ removed from the tail gas and stream 36 the remove of carbon dioxide. Stream 33 from the molecular sieve 34 is split into two flow paths or streams 19 and 37 of which the one path 19 as already mentioned here above is directed to pass through the heat exchanger 18 to receive heat released from the first reformation system 5 comprising the shifter 17 while other path 37 is sent to the DRI cooling vessel 10 of the reduction shaft 2. It should be noticed that the aim of the processing stage in molecular sieve 34 is to bring down the levels of CO and any existing other gases in the recycled gas to as low level as possible such that recycled gas in the two lines 19 and 37 is as close to pure hydrogen $H_2$ as possible. By refining the hydrogen level in the recycle gas not only to achieve a syngas with higher the reducing ratio or "R" and efficiency but also process conditions that also guarantees good reduction with iron ores of bad quality.

The syngas used as reduction medium in the present direct reduction process is a preheated mixture of essentially clean hydrogen $H_2$ coming from line 37 and natural gas for example $CH_4$. The plant is advantageously provided with adjusting means, not illustrated in the drawing, for controlling the amount of natural gas that is fed to be mixed with the recycled gas in line 37 so as to optimize the reduction and reforming reactions. The cold natural gas supplied to the process by line 38 and mixed with recycled gas coming from line 36 wherein the mixed gas is lead into the cooling vessel 10 by mixing with line 39 and thereafter passed through the hot DRI in the cooling vessel 10. Consequently the DRI in the cooling vessel is cooled while at the same time the mix of recycled gas and natural gas is heated before is supplied to the gas generator 3 of the present processing system. Preheating of the mixed gas up to 520° C. could preferably be made by exchange of heat from hot DRI in the cooling vessel 10. By controlling the natural gas content in the reducing gas entering the reactor 2 it is possible to directly control the reduction process in the reaction zone 8 of the reactor by appropriately adjusting the temperature of the load in the reaction zone, preferably between 800 to 900° C. and the reaction kinetics. The gas mix is extracted from the DRI cooling vessel 10 by extraction means and flows along an exhaust line 40 to the gas generator 3 and is partially oxidized with oxygen or air entering the gas generator via line 41. A complementary process of heating the reduction gas is provided at the point at which the gas mix enters the gas generator 3 via line 40, by injecting a predetermined amount of pure oxygen or oxygen-enriched air into the duct 40 by injecting a predetermined amount of pure oxygen or oxygen-enriched air into said duct 40 so as to produce a partial combustion of CO and $H_2$ and heat the reducing gas to be introduced to a temperature of between 850° to 1200° C. After undergoing the additional heating process, the reducing gas stream is fed into the first line 12 for reduction and reforming via second line 13. Before entering the reactor the resulting hot gas from the gas generator 3 is mixed with a low preheated gas stream of about 400° C. conducted by duct 20 mainly containing hydrogen $H_2$. This mixture which can be controlled at temperatures between 800 and 950° C. with adjusting means, not illustrated in the drawing, is feeded to the DR reactor 1 in which the reduction takes place. It should be noticed that the main reducing component in the gas will be the hydrogen.

With reference to FIG. 2 an alternative process schemes is described having a complementary heater for heating primary reformer effluent high in hydrogen $H_2$. Reference numerals in FIG. 2 correspond to FIG. 1 to demonstrate the fact that they refer to the same or similar means. Tail gas in line 32 is split into two flow paths 32 and 42 of which path 32, as mentioned here above, is used as tail gas in the steam generator 25, and the other part 42 is used as tail gas in a complementary recycle gas heater 43 for heating the recycled gas in line 37 before it is mixed with natural gas and passed through the DRI cooler 10. The recycled gas heated in the recycle gas heater 43 is conducted by line 44. The cold natural gas supplied to the process by line 38 and mixed with recycled gas coming from line 44 wherein the mixed gas is lead into the cooling vessel 10 by mixing line 39 and is passed through the hot DRI in the cooling vessel 10. Consequently the DRI in the cooling vessel is cooled while at the same time the mix of recycled gas and natural gas is heated before is supplied to the gas generator 3 of processing system.

The reduction gas fed to the reactor 8 is heated to a temperature above 910° C. before entering reactor 8 via the line 13. The said temperature is a good average figure not to get "sticking" in the reactor. The high amount of Hydrogen $H_2$ in the gas on one hand and the low molecular-weight of the other hand allow the reactor to be small in size.

The present invention is not limited to the above description and as illustrated in the drawings but can be changed and modified in a number of different ways within the framework of the idea of the invention specified in the following claims.

The invention claimed is:

1. A process for the direct reduction of iron ore, the processing comprising the steps of:
   a) extracting an off gas from a gravitational furnace for recycling;
   b) cleaning the off gas from particles and dust in a cleaning system;
   c) obtaining a de-watered off gas by shifting the carbon oxide (CO) and steam ($H_2O$) present in the off gas to $CO_2$ and $H_2$ in a first reformation step using a water shift gas reaction;
   d) processing the de-watered off gas in a compressor or pumping means,
   e) removing the $CO_2$ from the de-watered off gas in a second reformation step using a carbon dioxide ($CO_2$) absorber means and a stripping means to form a first syngas essentially comprised of CO and $H_2$;
   f) removing nitrogen ($N_2$) and carbon oxide (CO) from the first syngas in a third reformation step using a $N_2$ and CO absorber means to form a second syngas essentially comprised of hydrogen ($H_2$);
   g) dividing the second syngas into a first flow path and a second flow path;
   h) mixing the second syngas in the first flow path with natural gas supplied by an external source to form a first gas mix stream;
   i) heating the second syngas in the second flow path from step g) by exchange of sensible heat gained from the de-watering process of step c) to form a heated syngas;
   j) heating the first gas mix stream by exchange of sensible heat from the reduced metal product cooling zone;
   k) extracting the first gas mix stream from a reduced metal product cooling zone in the furnace to form a second gas mix stream supplied to a gas generator;
   l) heating the second gas mix stream from step k) by injecting oxygen ($O_2$) in a line to form an oxygen ($O_2$) injected gas mixture and leading the oxygen ($O_2$) injected gas mixture to the gas generator;
   m) processing the oxygen $O_2$ injected gas mixture in step l) in the gas generator to obtain a first reducing gas mixture and leading the first reducing gas mixture from the gas generator to the furnace;
   n) mixing the heated syngas in step i) with the first reducing gas mixture in step m) to form a second reducing gas mixture;
   o) feeding the second reducing gas mixture formed in step n) to the reduction zone of the furnace.

2. The process according to claim 1, further comprising a heat exchanging means to exchange sensible heat from the de-watered off gas formed in step c) to the $CO_2$ stripping means of the second reformation step.

3. The process according to claim 1, wherein in step m) the first reducing gas mixture leaves the gas generator at a temperature between 800 and 1400° C.

4. The process according to claim 1, wherein in step o) the second reducing gas mixture enters the reduction zone of the reactor having a temperature of 910° C. or above.

5. The process according to claim 1, wherein the first syngas is divided into a first stream and a second stream of which the first syngas in the first stream is used as a combustible tail gas in a steam generator generating heat for the second reformation step and the first syngas in the second stream is fed to the third reformation step of step f).

6. The process according to claim 1, wherein the result of the succeeding first, second and third reformation steps is a stream of essentially pure hydrogen ($H_2$).

7. The process according to claim 1, wherein step m) further comprises heating by injecting a predetermined amount of oxygen ($O_2$) and/or air into the second gas mix stream coming from the cooling zone.

8. The process according to claim 1, wherein nitrogen ($N_2$) and carbon oxide (CO) removed by the third reformation step are burned off together with carbon dioxide removed by the second reformation step.

9. The process according to claim 1, wherein the dust cleaning system is comprised of a multi cyclone and a succeeding filter through which the off gas passes.

10. The process according to claim 1, wherein the first reformation step uses any catalyst selected from magnetite, any transition metals or transition metal oxides.

11. The process according to claim 1, wherein the third reformation system uses any physical separation means selected from membranes, molecule sieves, or any suitable chemical absorption system.

12. The process according to claim 11, wherein the third reformation system is comprised of a molecular sieve that comprises any suitable material having an open structure selected from aluminium silicate, clay, active carbon or synthetic carbon.

13. The process according to claim 1, wherein the dewatered off gas from step c) is cooled by a cooling means before entering the compressor or pumping means.

14. The process according to claim 1, wherein a complementary heater is arranged for heating the second syngas obtained after the third reformation step and before step h) in which the second syngas is mixed with natural gas.

15. The process according to claim 14, wherein a stream of tail gas from the second reformation step is used as combustible gas in the complementary heater.

16. The process according to claim 3, wherein the first reducing gas mixture leaves the gas generator at a temperature of 1200° C.

17. The process according to claim 10, wherein the first reformation step uses brown iron in the form of stones as a catalyst.

* * * * *